United States Patent
Kobayashi

(10) Patent No.: US 10,101,899 B2
(45) Date of Patent: Oct. 16, 2018

(54) WIRELESS COMMUNICATION DEVICE AND INFORMATION COMMUNICATION METHOD

(71) Applicant: KYOCERA Corporation, Kyoto-shi, Kyoto (JP)

(72) Inventor: Hiroki Kobayashi, Osaka (JP)

(73) Assignee: KYOCERA Corporation, Kyoto (JP)

( * ) Notice: Subject to any disclaimer, the term of this patent is extended or adjusted under 35 U.S.C. 154(b) by 1085 days.

(21) Appl. No.: 14/262,408

(22) Filed: Apr. 25, 2014

(65) Prior Publication Data

US 2014/0325384 A1  Oct. 30, 2014

(30) Foreign Application Priority Data

Apr. 25, 2013 (JP) ................................ 2013-093062

(51) Int. Cl.
| | | |
|---|---|---|
| *G06F 3/048* | (2013.01) | |
| *G06F 3/0488* | (2013.01) | |
| *G06F 3/0481* | (2013.01) | |
| *G06F 3/0484* | (2013.01) | |

(52) U.S. Cl.
CPC .......... *G06F 3/0488* (2013.01); *G06F 3/0484* (2013.01); *G06F 3/04812* (2013.01); *G06F 3/04817* (2013.01)

(58) Field of Classification Search
CPC . G06F 3/0484; G06F 3/04817; G06F 3/04812
See application file for complete search history.

(56) References Cited

U.S. PATENT DOCUMENTS

| | | | | |
|---|---|---|---|---|
| 5,303,146 A | * | 4/1994 | Ammirato ............. | G06F 3/0489 715/204 |
| 8,479,102 B2 | * | 7/2013 | Son ....................... | G06F 9/4443 715/744 |
| 9,313,309 B2 | * | 4/2016 | Hautala ................. | G06F 3/0482 |
| 2004/0100497 A1 | * | 5/2004 | Quillen ................. | H04L 67/36 715/751 |
| 2007/0279379 A1 | * | 12/2007 | Stefanik ................ | G06F 8/61 345/156 |
| 2010/0223563 A1 | * | 9/2010 | Green ................... | G06F 3/0481 715/762 |

(Continued)

FOREIGN PATENT DOCUMENTS

| | | | | |
|---|---|---|---|---|
| GB | 2478466 A | * | 9/2011 | ............... G06F 8/61 |
| JP | 2006-074582 A | | 3/2006 | |

*Primary Examiner* — Ryan F Pitaro
(74) *Attorney, Agent, or Firm* — Procopio Cory Hargreaves and Savitch LLP

(57) ABSTRACT

A wireless communication device, system and methods are presented. The wireless communication device includes a display unit, a transmitting unit, a touch input, a storage unit and an execution unit. The display unit displays screens comprising display objects related to one or more applications. The touch input acceptance unit accepts a touch input. The storage unit stores screen information comprising icons related at least to the applications, disposition information of the icons on the screens, and acquisition source information for the applications. The execution unit causes the transmitting unit to transmit screen information associated with the screens selected based on input accepted by the touch input acceptance unit.

10 Claims, 8 Drawing Sheets

(56) References Cited

U.S. PATENT DOCUMENTS

| | | | |
|---|---|---|---|
| 2011/0185283 A1* | 7/2011 | Jun | H04M 1/72572 715/745 |
| 2012/0120316 A1* | 5/2012 | Lee | H04N 21/42204 348/564 |
| 2012/0177067 A1* | 7/2012 | Cho | H04N 21/4126 370/503 |
| 2013/0083075 A1* | 4/2013 | Luomala | G09G 5/14 345/660 |
| 2013/0103665 A1* | 4/2013 | Kasterstein | G06F 17/30864 707/706 |
| 2013/0125016 A1* | 5/2013 | Pallakoff | G06F 3/04817 715/748 |
| 2013/0254291 A1* | 9/2013 | Park | H04L 65/403 709/204 |
| 2014/0040797 A1* | 2/2014 | Qian | G06F 3/0481 715/765 |
| 2014/0082519 A1* | 3/2014 | Wang | H04M 1/72522 715/748 |
| 2014/0089821 A1* | 3/2014 | Rios, III | G06F 3/14 715/761 |
| 2014/0337752 A1* | 11/2014 | Cammarata | H04M 1/72563 715/744 |
| 2015/0026615 A1* | 1/2015 | Choi | G06F 3/0484 715/765 |
| 2015/0082241 A1* | 3/2015 | Kang | G06F 3/04845 715/803 |
| 2015/0208115 A1* | 7/2015 | Kutsumi | H04N 21/4432 725/32 |

* cited by examiner

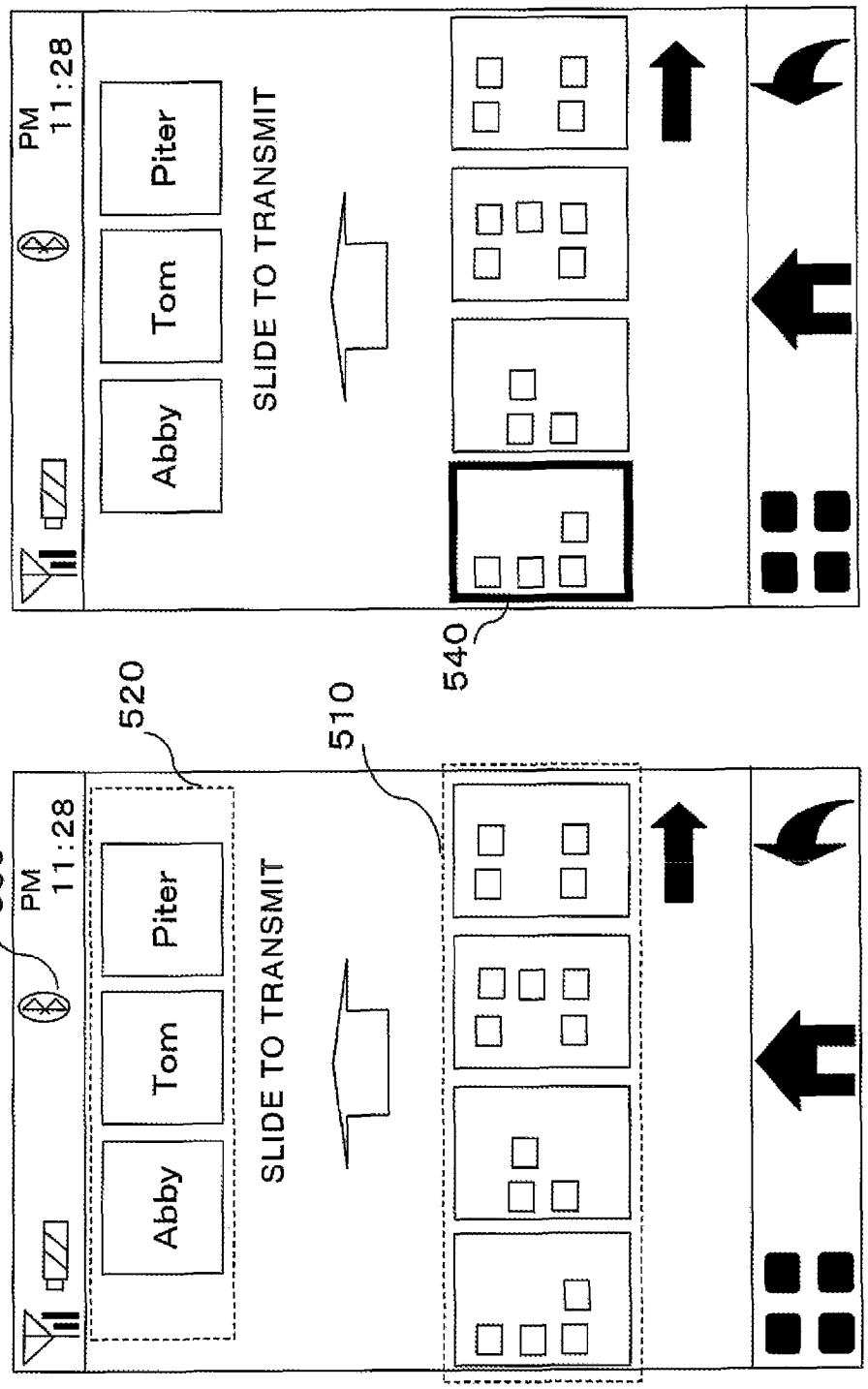

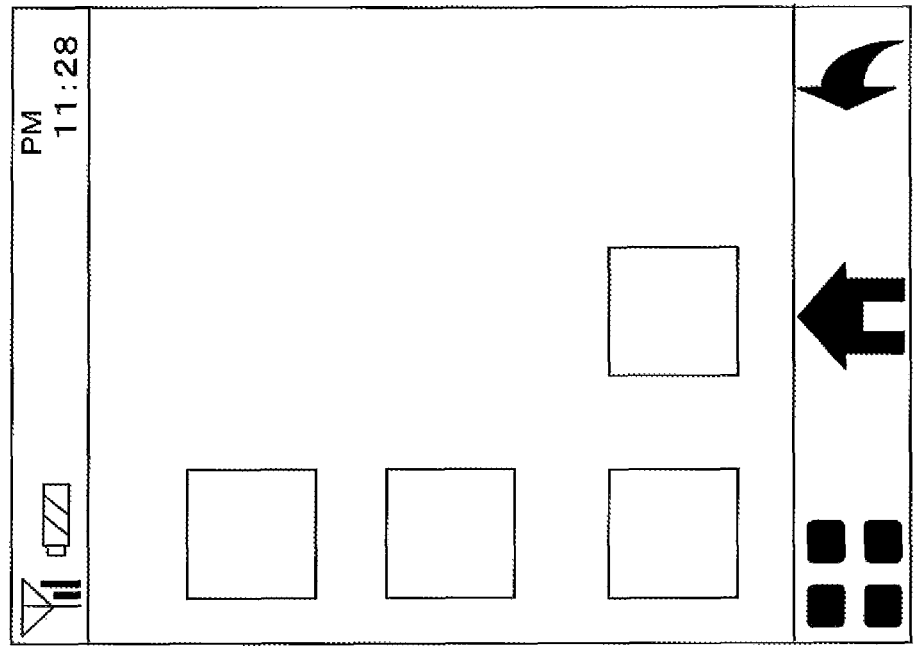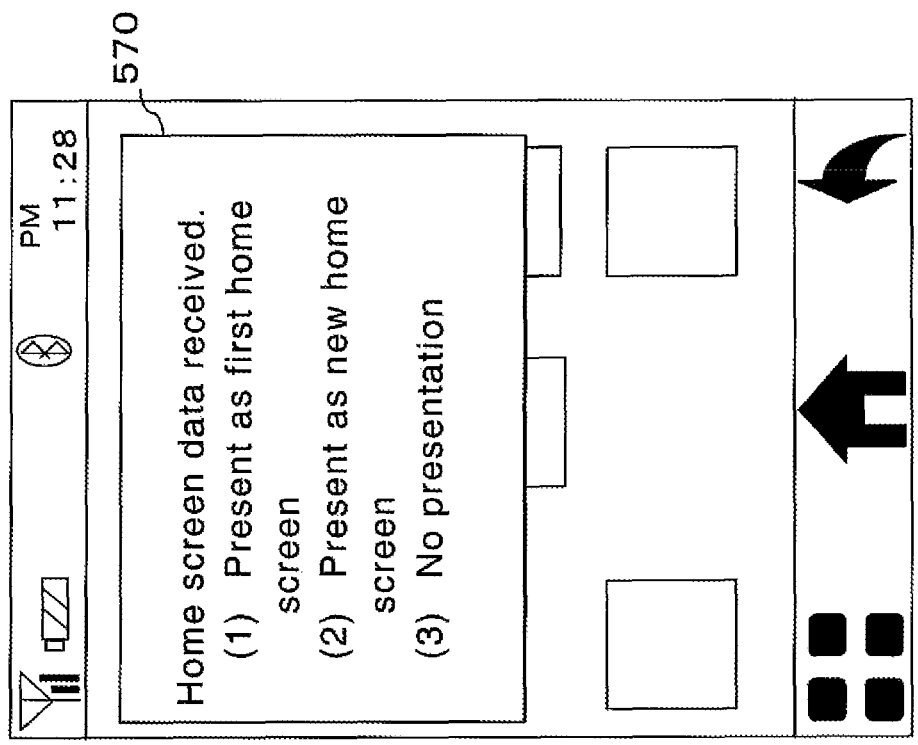

WIRELESS COMMUNICATION DEVICE AND INFORMATION COMMUNICATION METHOD

CROSS-REFERENCE TO RELATED APPLICATION

The present application claims priority under 35 U.S.C. § 119 to Japanese Patent Application No. 2013-093062, filed on Apr. 25, 2013. The content of which is incorporated by reference herein in its entirety.

FIELD

Embodiments of the present disclosure relate generally to wireless communication devices, and more particularly relate to an electronic device with a wireless communication capability.

BACKGROUND

In the conventional art, transmission by e-mail or near-field communication is performed in a communication terminal, in which data is converted to a format for execution of a prescribed application. In a conventional wireless communication device such as a smartphone, a user may dispose icons and widgets related to applications at arbitrary positions on a plurality of home screens. The user can share information related to icons, dispositions of icons and the like on the home screens with another person with a complicated operation such as sending those data individually, by e-mail, or near-field communication.

SUMMARY

A wireless communication device, system and methods are presented. A display unit displays screens including display objects related to one or more applications. A touch input acceptance unit accepts a touch input. A storage unit stores screen information including icons related at least to the applications, disposition information of the icons on the screens, and acquisition source information for the applications. An execution unit causes the transmitting unit to transmit screen information associated with the screens selected based on input accepted by the touch input acceptance unit.

In an embodiment, a wireless communication device comprises: a display unit, a transmitting unit, a touch input acceptance unit, a storage unit, and an execution unit. The display unit displays screens comprising display objects related to one or more applications. The touch input acceptance unit accepts a touch input. The storage unit stores screen information comprising icons related at least to the applications, disposition information of the icons on the screens, and acquisition source information for the applications. The execution unit causes the transmitting unit to transmit screen information associated with the screens selected based on input accepted by the touch input acceptance unit.

In another embodiment, an information communication method in a communication terminal comprising a display unit configured to display a plurality of screens comprising display objects related to applications, and a transmitting unit, accepts a touch input, stores screen information comprising icons related to at least the applications, disposition information of the icons on the screens, application names, and acquisition source information for the applications, and transmits screen information associated with the screens selected based on the touch input.

In a further embodiment, a wireless communication system comprises: a wireless communication base station, and a wireless communication device. The wireless communication device comprises: a display unit, a transmitting unit, a touch input acceptance unit, a storage unit, and an execution unit. The display unit displays screens comprising display objects related to one or more applications. The touch input acceptance unit accepts a touch input. The storage unit stores screen information comprising icons related at least to the applications, disposition information of the icons on the screens, and acquisition source information for the applications. The execution unit causes the transmitting unit to transmit screen information associated with the screens selected based on input accepted by the touch input acceptance unit.

BRIEF DESCRIPTION OF THE DRAWINGS

FIG. 6A and FIG. 6B are illustrations of an exemplary screens displayed by a communication terminal according to an embodiment of the disclosure.

FIG. 8A and FIG. 8B are drawings showing examples of screens displayed by the communication terminal.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a mobile electronic device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (PDA), tablets, personal handy phone system (PHS), lap top computers, TV's, Global Positioning Systems (GPS's) or navigation systems, health equipment, and other communication device. As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

In a communication terminal according to one embodiment of the present disclosure, if an operation is done to transmit information related to a home screen that includes display objects such as icons and widgets, screen information (home screen information) regarding display objects on the selected home screen can be transmitted to a specified communication terminal. In the embodiment described below, a specific description is presented of an embodiment of a communication terminal of the present disclosure, using FIG. 1 to FIG. 8.

First, the constitution of a communication terminal 100, which is an embodiment of the present disclosure, will be described, using FIG. 1 to FIG. 3.

Figure 1:
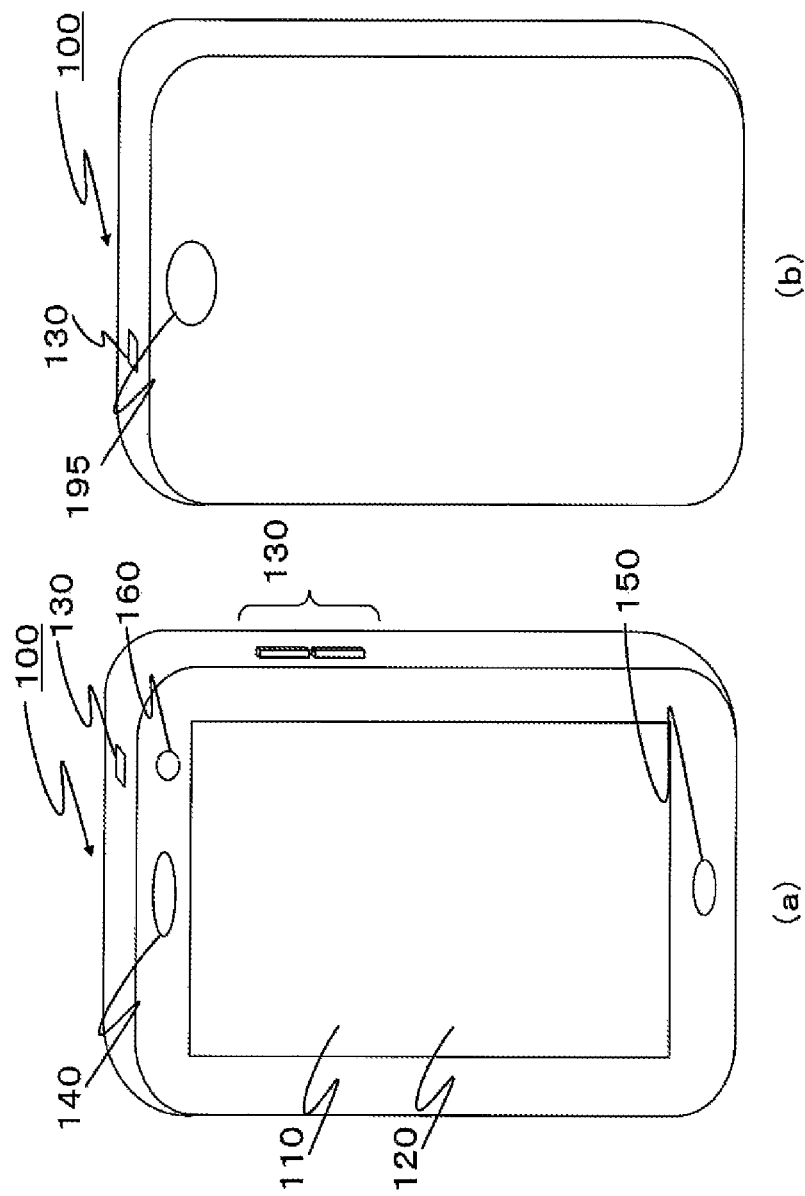
FIG. 1 is an illustration of an exemplary outer view of a communication terminal according to an embodiment of the disclosure.

FIG. 1 shows outer views of the communication terminal 100. FIG. 1A is a front view of the communication terminal 100, and FIG. 1B is a rear view of the communication terminal 100. The communication terminal 100 shown in the outer views of FIG. 1 includes a display unit 110, a touch input unit 120, a key input unit 130, a sound output unit 140, a sound input unit 150, and a light-emitting unit 160. In this document, unit and module may be used interchangeably.

The display unit 110 includes, for example but without limitation, a liquid-crystal display of the backlighted type that makes a color display, and includes a liquid-crystal panel and a backlight for shining illumination onto the liquid-crystal panel. The display unit 110 displays display objects such as icons and widgets and various information of images and the like, based on control signals input from the control unit 230, described below. The display unit 110 is not limited to a liquid-crystal display, and may include, for example but without limitation, an organic Electroluminescent (EL) display, a display with a matrix arrangement of a plurality of light-emitting diodes (LEDs), or other display.

The touch input unit 120 is disposed over the display surface of the display unit 110, and accepts touch operations from a user. The touch input unit 120 outputs a touch operation as an input signal to the control unit 230.

The touch input unit 120 further detects a position of acceptance (detected position) of a touch operation, and outputs a coordinate data corresponding to the detected position to the control unit 230. That is, by performing a touch operation on the touch input unit 120, the user inputs operation positions, and directions (coordinates) to the communication terminal 100.

The user can perform various touch operations by touching the touch input unit 120 with a finger. Types of touch operations include, for example but without limitation, a tap operation, a flick operation, a slide operation, a drag operation, a long-tap operation, or other touch operations. A tap operation includes, for example, a finger coming into contact with the touch input unit 120 and then released from the touch input unit 120 after a short period of time. A flick operation includes, for example, when the touch input unit 120 is flicked with the finger in an arbitrary direction. A slide operation includes, for example, a finger slid in an arbitrary direction while remaining in contact with the touch input unit 120. A drag operation includes, for example, a finger released from the touch input unit 120 after a slide operation. That is, flick, slide, and drag operations are touches accompanied by movement of the touch position. A long-tap operation includes, for example, a finger coming into contact with the touch input unit 120, held at the same position for a prescribed amount of time, and then released from the touch input unit 120.

The touch operations will be described in more detail below. For example, after an input at a prescribed touch position on the touch input unit 120 is detected, if the touch is no longer detected within a pre-established first time, that is, if the operation of removing the finger from the touch input unit 120 occurs, the control unit 230 determines that a tap operation has occurred. If an input at a prescribed touch position on the touch input unit 120 is detected and, after the touch position has moved more than a first pre-established distance within a pre-established second time, if the input to the touch position is no longer detected, the control unit 230 determines that a flick operation has occurred. After an input to a prescribed touch position on the touch input unit 120 is detected, if the touch position moves more than a pre-established second distance, the control unit 230 determines that a slide operation has occurred. After an input at a prescribed touch position on the touch input unit 120 is detected, if the touch position remains detected for more than a pre-established third time and after that if the touch position is no longer detected, the control unit 230 determines that a long-tap operation has occurred.

The touch operations will be described in more detail below, in relation to FIG. 2. FIG. 2 is an example of a screen (hereinafter home screen) displayed on the display unit 110. This screen includes main touch keys 122, icons 124 related to applications, and widgets 126 that launch applications simply.

The main touch keys 122 perform various execution based on touch operations. For example, when a touch operation of the menu key 122(*a*) is accepted, a menu screen is displayed. The menu screen includes, for example but without limitation, a button that displays an address book, a button that changes the brightness of the display, a button that switches near-field communication on and off, or other activation button(s). When launching an application, a touch operation of the home key 122(*b*) is accepted, and the display of the application execution screen on the display unit 110 switches to the home screen as shown in FIG. 2. When a touch operation of the return key 122(*c*) is accepted, the screen previously displayed on the display unit 110 replaces the current displayed screen on the display unit 110.

The icons 124 include a type of display object indicating application shortcuts, and when any of them accept a tap operation, an application associated with the tapped icon is launched. Icons 124 include, for example but without limitation, an icon that executes a telephone function, an icon that launches an e-mail function, an icon that launches a game, or other icon. When a long tap operation of each of the icons 124 is accepted, each of the icons 124 changes state into a state enabling its display position to be moved. After that, if an operation of moving the icon 124 on the display and releasing the finger (or other means for activating the operation) is accepted, each of the icons 124 will be disposed at the position from which the finger was released.

The widgets 126 include a type of display object that launch applications simply and display information in accordance with the current state. Widgets 126 include, for example but without limitation, a widget that displays the weather information, a widget that displays a schedule, or other widget. When a tap operation on a widget 126 is accepted, the associated application is launched. Additionally, widgets 126 may be arranged at arbitrary positions on the screen by performing the same type of operation as in the case of icons. The communication terminal 100 stores therein a plurality of home screens as shown in FIG. 2 as explained in more detail below. When one home screen is displayed on the display unit 110, the displayed home screen is switched by a left or right flick operation.

The key input unit 130 may be constituted, for example but without limitation, by a hardware key, or other input unit suitable for accepting input operation, and accepts an input operation from the user. The input accepted by the key input unit 130 is output as an input signal to the control unit 230. The key input unit 130 allocated thereto inputs that, for example but without limitation, adjust a volume, switch a power on and off, or other input.

The sound output unit 140 is constituted, for example but without limitation, by a speaker, or other output unit suitable for outputting a sound to outside, based on an analog signal output from a signal processing unit 210.

The sound input unit 150 is constituted by, for example but without limitation, a microphone, or other input unit suitable for converting a sound from outside, such as a voice to an analog signal output to the signal processing unit 210.

The light-emitting unit 160 is constituted by, for example but without limitation, a light-emitting element such as an LED, or other light-emitting unit. The light-emitting unit 160 emits a light to the outside by a control signal output from the control unit 230. The light-emitting unit 160 provides notification of, for example but without limitation, a receipt of a telephone call, a reception of an e-mail, that a time of an alarm has been reached by emitting light to the outside, or other notification.

Figure 3:
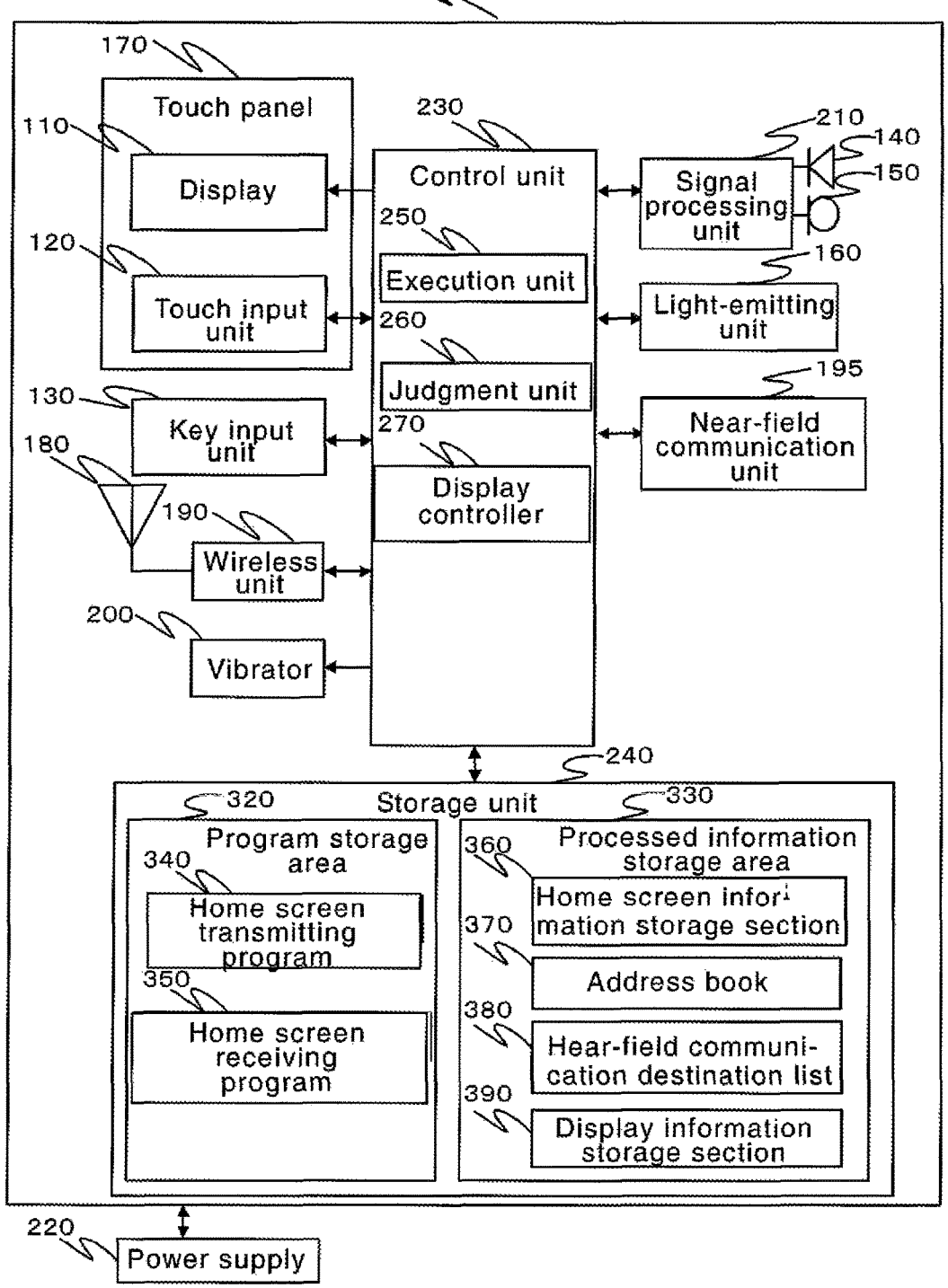
FIG. 3 is an illustration of an exemplary functional block diagram of a communication terminal according to an embodiment of the disclosure.

FIG. 3 is a block diagram showing the communication terminal 100. The communication terminal 100 may have functions, material, and structures that are similar to the communication terminal 100 shown in FIG. 1. Therefore common features, functions, and elements may not be redundantly described here. The communication terminal 100 shown in FIG. 3 may include the touch input unit 120, the key input unit 130, the sound output unit 140, the sound input unit 150, the light-emitting unit 160, a touch panel 170, an antenna 180, a wireless unit 190, a vibrator 200, the signal processing unit 210, the control unit 230, the storage unit 240, and a power supply 220.

The touch panel 170 is configured so that the above-described touch input unit 120 covers the surface of the display unit 110. The touch input unit 120 and the display unit 110 may be made separate or may be combined. That is, the touch input unit 120 and the display unit 110 need not be integrated as the touch panel 170.

The antenna 180 receives electromagnetic waves of a prescribed frequency and outputs this as an RF signal to the wireless unit 190, and outputs an RF signal output from the wireless unit 190 to a base station as electromagnetic waves of a prescribed frequency.

The wireless unit 190 communicates wirelessly with, for example but without limitation, another portable terminal, a base station, or other communication devices. The wireless unit 190 performs demodulation and decoding of a pre-scribed Radio Frequency (RF) signal input from the antenna 180, converting the signal to a digital voice signal, and other function suitable for operation of the communication terminal 100. The wireless unit 190 also performs encoding and modulation of a digital voice signal input from the control unit 230, converting the signal to an RF signal and outputting it to the antenna 180, and other function suitable for operation of the communication terminal 100. Additionally, the communication terminal 100 includes an e-mail function and sends and receives e-mail to and from another communication terminal, via the wireless unit 190.

A near-field communication unit 195 performs near-field communication by, for example but without limitation, Bluetooth™, infrared communication, or other communication protocol.

The vibrator 200 includes a motor and generates a mechanical vibration by a control signal output from the control unit 230. The vibrator 200 provides notification of, for example but without limitation, a receipt of phone call, a receipt of an e-mail, that the time of an alarm has been reached, or other notification by a mechanical vibration.

The signal processing unit 210 converts the digital signal output from the control unit 230 to an analog signal and outputs the converted analog signal to the sound output unit 140. The signal processing unit 210 also converts the analog signal input from the sound input unit 150 to a digital signal and outputs it to the control unit 230.

The power supply 220 is configured to supply electrical power to the various elements of the communication terminal 100. The power supply 220 may comprise rechargeable battery, such as but without limitation, a lithium ion battery, or other battery.

The control unit 230 includes a Central processing unit (CPU), a Digital Signal Processing Unit (DSP), and/or other unit. The control unit 230 performs overall management and executes various functions of the communication terminal 100 by controlling the various constituent elements of the communication terminal 100. For example, the control unit 230 executes a near-field communication function, an e-mail transmitting function and the like, based on input accepted by the key input unit 130 or the touch input unit 120. The control unit 230 also executes a program stored in the storage unit 240.

The control unit 230, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The storage unit 240 is configured to store, maintain, and provide data as needed to support the functionality of the communication terminal 100 in the manner described below. In some embodiments, the storage unit 240 may comprise, for example but without limitation, a non-volatile storage device (non-volatile semiconductor memory, hard disk device, optical disk device, and the like), a random access storage device (for example, SRAM, DRAM), or any other form of storage medium known in the art. The storage unit 240 stores a control program providing a control function to the control unit 230.

The storage unit 240 stores control programs for assigning control functions to the control unit 230 as well as various applications. The storage unit 240 is also used as a working memory that stores various data that is temporarily used or generated during the execution of applications.

The storage unit 240 stores, for example but without limitation, a program executed by the communication terminal 100, and display information displayed on the display unit 110.

Characteristic features of the storage unit 240 are described in more detail below.

The storage unit 240 includes a program storage area 320 and a processed information storage area 330. The program storage area 330 stores programs executed by the communication terminal 100. The processing information storage area 330 stores various information (described below) processed when a program is executed. In the following, the "storage area 240" will be referred to when not making a distinction between the program storage area 320 and the processed information storage area 330. The program storage area 320 stores, for example, a program for performing voice communication, a browser for displaying a website, and an e-mail program for creating, displaying, sending, and receiving e-mail. In addition, the program storage area 320 stores, a home screen transmitting program 340 (FIG. 4) for sending home screen information described in more detail below, and a home screen receiving program 350 (FIG. 5) for presenting received home screen information.

The processed information storage area 330 stores therein, for example but without limitation, a home screen information storage section 360 that stores screen information regarding the home screen (hereinafter, home screen information), an address book 370 that stores address information including such information as e-mail addresses, telephone numbers, and prescribed graphics (hereinafter, address graphics) associated with names, and a near-field communication destination list 380 that stores address information for authorizing near-field communication, or other data.

Figure 2:
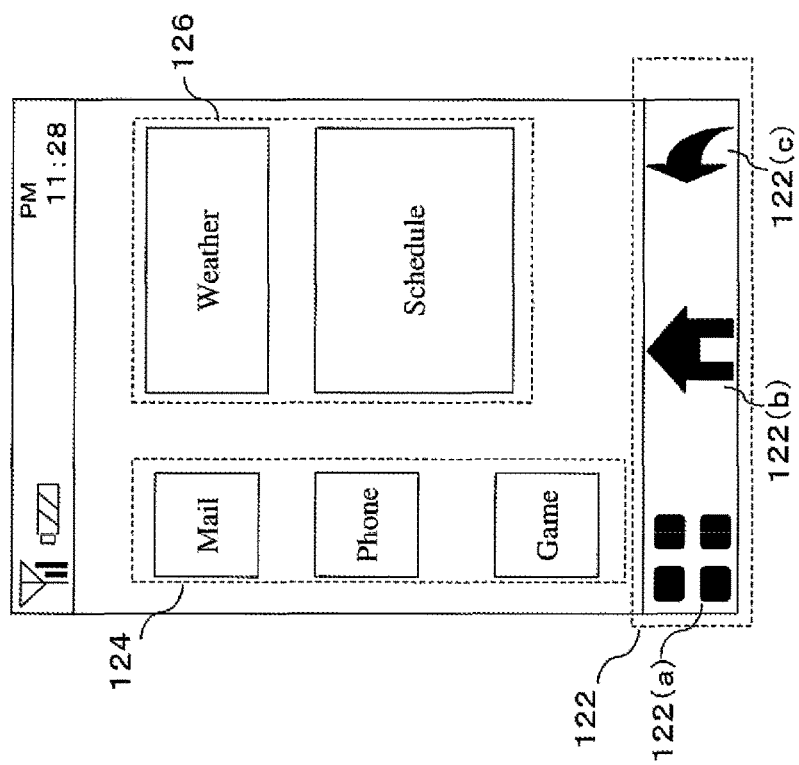
FIG. 2 is an illustration of an exemplary screen displayed by the communication terminal according to an embodiment of the disclosure.

The home screen information storage section 360 stores therein, for example but without limitation, information regarding a home screen as shown in FIG. 2 which is displayed on the display unit 110 when power is pressed. In this manner, the home screen information storage section 360 stores therein home screen information for constituting each home screen (for example, five screens in an initial setting). One home screen is displayed on the display unit 110 and the displayed home screen may be switched by left and right flicks. Each home screen includes prescribed display objects (including icons and widgets) that are set based on operations accepted from the user. Home screen information includes, for example but without limitation, disposition information of display objects on the home screen (coordinate information), acquisition source information for applications corresponding to display objects (acquisition source URLs), thumbnail graphics, application names, and applications associated with display objects.

The display information storage section 390 stores therein information displayed on the display unit 110, as shown in FIG. 6, FIG. 7, and FIG. 8 when programs stored in the program storage area 320 are executed.

Constituent elements provided for the control unit 230 to execute programs stored in the program storage area 320 will now be described.

The execution unit 250 executes programs stored in the storage unit 240. An overview of following two programs, that is, the home screen transmitting program 340 (FIG. 4) for transmitting a home screen information and the home screen receiving program 350 (FIG. 5) for presenting received home screen information, which are executed by the execution unit 250, will be described below.

The execution unit 250 executes the home screen transmitting program 340 and transmits to a prescribed destination home screen information selected by the user. The home screen information transmitting program 340 first determines whether or not an operation has been made to execute home screen transmission. An operation to execute home screen transmission includes, for example but without limitation, a long-tap operation at the home key 122(b), or other operation suitable for execute of the home screen. If it is determined that an operation to execute home screen transmission has been made, a thumbnail graphic 510 of the home screen to be generated based on the home screen stored in the storage unit 240 will be displayed on the display unit 110, as shown at the bottom of FIG. 2A. Then, if near-field communication is on, a search is made for a communication terminal including address information that has been authorized for near-field communication, based on the near-field communication destination list 380.

Next, if communication terminals including address information authorized for near-field communication are within range for near-field communication, information related to the terminals is displayed as near-field communication candidates on the display unit 110, as shown at the top of FIG. 6A. In the example of FIG. 6A, address graphics 520 including the address information are displayed on the display unit 110. Then, if a thumbnail graphic related to the home screen information to be transmitted is selected from among thumbnail graphics 510 displayed on the display unit 110 by a touching operation to slide it to over the address graphics 520 displayed at the top of FIG. 6A, the home screen information corresponding to the selected thumbnail graphic is transmitted to the destination corresponding to the selected address graphic 520. When a thumbnail graphic is selected, the selected thumbnail graphic 540 is displayed in a different form from the other thumbnail graphics, as shown in FIG. 6B.

Figure 7A:
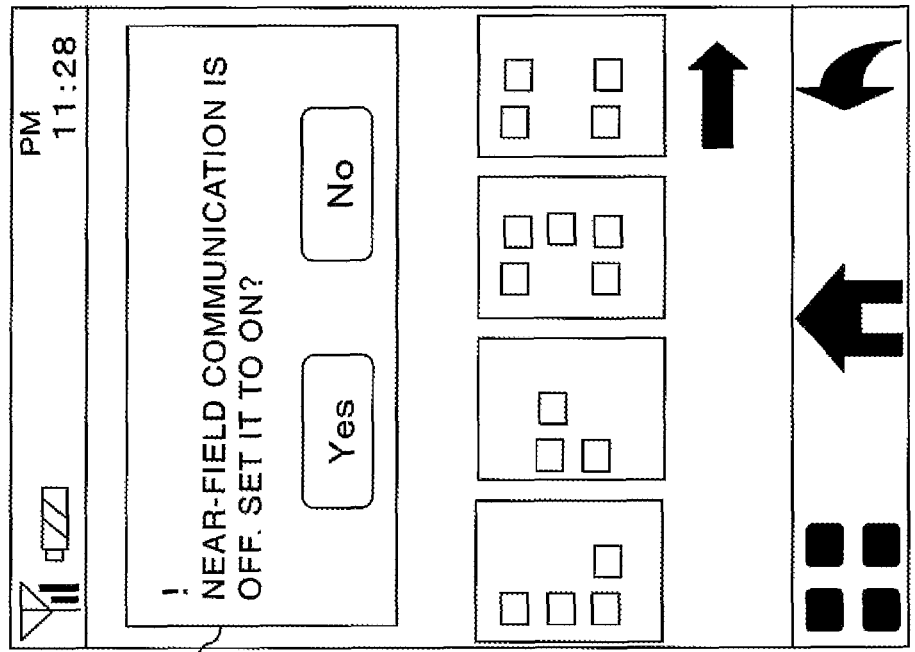
FIG. 7A and FIG. 7B are illustrations of an exemplary of screens displayed by a communication terminal according to an embodiment of the disclosure.
Figure 7B:
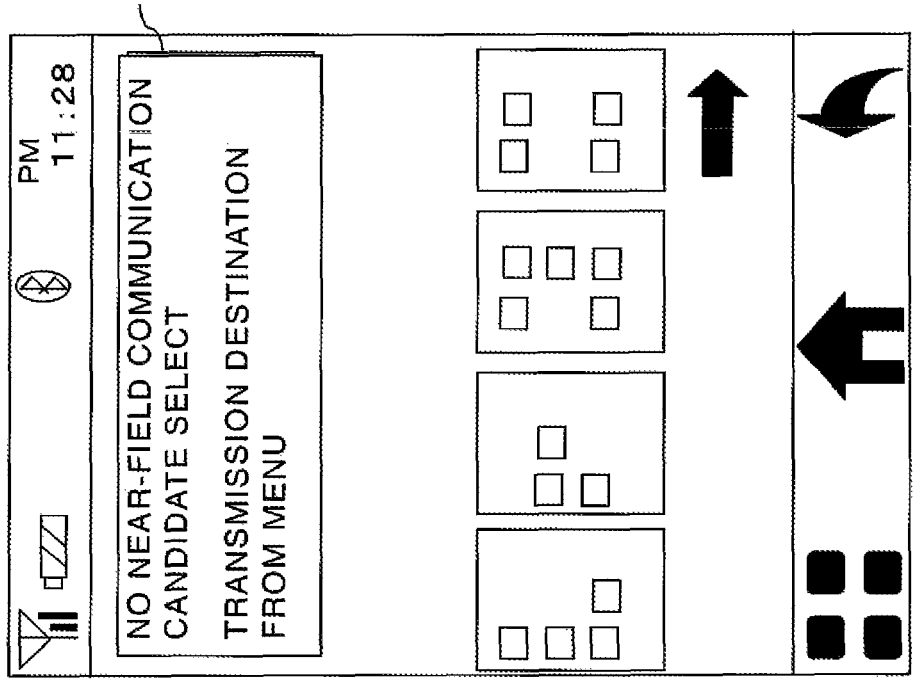

If, however, a near-field communication candidate is not found or is not set, or if near-field communication is off, a display to that effect is made on the display unit 110 (FIG. 7A and FIG. 7B). Then, if a destination for transmission of the home screen information (transmission destination of screen information) is selected from the address book, the home screen information is transmitted to the selected destination by e-mail.

The home screen receiving program 350 monitors whether or not home screen information has been received and, if it has been received, that home screen information has been received is displayed on the display unit 110 and acceptance of a presentation operation is enabled, as shown in FIG. 8A. If a presentation operation has been accepted, a first home screen based on the accepted presentation operation or a new home screen based on the home screen information is presented. FIG. 8B shows an example in which the communication terminal 100 receives a home screen corresponding to the thumbnail graphic 540 selected at another communication terminal and in which a presentation operation is accepted and the home screen is displayed on the display unit 110.

A judgment unit 260 determines the type of input made to the control unit 230. For example, the judgment unit 260 determines whether the input accepted by the touch input unit 120 is an input for starting the home screen transmission program 340, an operation to present the home screen information, or an operation to select the home screen to be transmitted. The judgment unit 260 also makes various determinations that are necessary when the execution unit 250 processes various programs.

A display controller 270 controls the display on the display unit 110 of screens such as shown in FIG. 2, FIG. 6, FIG. 7, and FIG. 8 based on the program executed by the executing unit 250.

Figure 4:
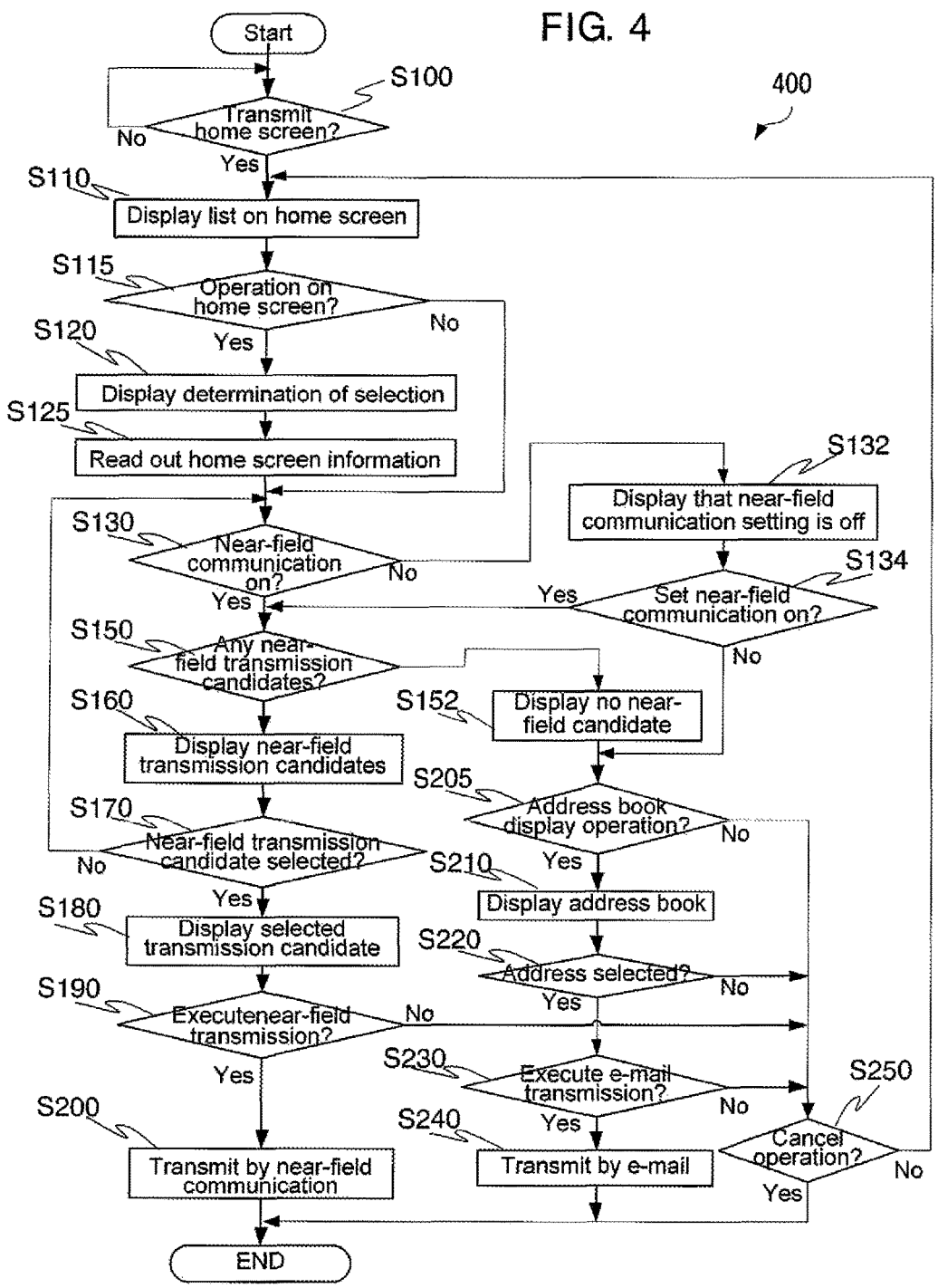
FIG. 4 is an illustration of an exemplary flowchart showing a home screen transmitting program processed by a communication terminal according to an embodiment of the disclosure.

FIG. 4 is an illustration of an exemplary flowchart showing a screen transmitting program 340 (process 400) that can be executed by the executing unit 250 according to an embodiment of the disclosure. The various tasks performed in connection with the process 400 may be performed by software, hardware, firmware, a computer-readable medium having computer executable instructions for performing the process method, or any combination thereof. The process 400 may be recorded in a computer-readable medium such as a semiconductor memory, a magnetic disk, an optical disk, and the like, and can be accessed and executed, for example, by a computer CPU in which the computer-readable medium is stored.

It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. In some embodiments, portions of the process 400 may be performed by different elements of the communication terminal 100 explained above. Process 400 may have functions, material, and structures that are similar to the embodiments shown in FIGS. 1-3. Therefore common features, functions, and elements may not be redundantly described here.

First, in the home screen transmitting program 340, the judgment unit 260 monitors whether or not an input for executing home screen transmission has been accepted from the touch input unit 120 (S110).

If the judgment unit 260 determines that an input for executing home screen transmission has been accepted from the touch input unit 120, the display controller 270 generates and displays on the display unit 110 the thumbnail graphics for each home screen, based on home screen information stored in the storage unit 240, as shown in FIG. 2 (S115).

Next, the judgment unit 260 determines whether or not a touch operation to a thumbnail graphic on the home screen displayed on the display unit 110 has been accepted (S115) and, if it is determined that a tap operation has been accepted (YES at S115), the display controller 270 displays that the transmission candidate has been determined (S120). The execution unit 250 then reads out the home screen information corresponding to the selected thumbnail graphic from the storage unit 240 (S120). The home screen information includes, for example but without limitation, disposition information related to display objects displayed on the home screen, applications associated with the display objects, download source URLs for the applications, thumbnail graphics, or other information.

After the processing of S125, if the judgment unit 260 determines that an operation to select a home screen had not been made (NO at S115) it determines whether or not near-field communication is on (S 130). If the judgment unit 260 determines that there is a terminal capable of near-field communication that can be a transmission candidate (YES at S150), the display controller 270 displays the transmission candidate graphic 520 on the display unit 110, as shown in FIG. 6 (S160)

Then, the judgment unit 260 determines that an operation to select a transmission candidate graphic 520 has been accepted (YES at S170), the selected transmission candidate graphic 520 is displayed on the display unit 110.

Next, when the judgment unit 260 determines that an operation that executes near-field transmission has been accepted, the execution unit 250 transmits the home screen information to the selected transmission candidate by near-field communication (S200).

In this case, an operation that selects home screen at S115 refers to a touch of a thumbnail graphic, and an operation that selects a near-field communication transmission candidate at S170 refers to an operation in which the touch position is moved from the position at which the thumbnail graphic is selected to a region in which the transmission candidate is displayed, while maintaining continuous touching. The operation that executes near-field communication at S200 refers to an operation of removing the finger from the touch input unit after an operation to move to the touch position. That is, home screen information selected based on a slide operation by the user is transmitted by near-field communication to the selected near-field communication destination.

In the processing of S150, if there is no near-field communication candidate (NO at S150), that is, if a terminal that will be a near-field communication candidate has not be set into the storage unit 240 beforehand, or if communication has not been established with another communication terminal that will be a near-field communication candidate within the near-field communication range, a message 550 such as shown in FIG. 7A to the effect that there is no near-field communication candidate will be displayed on the display unit 110.

If, however, near-field communication is off (NO at S130), the display controller 270 displays a message 560 such as shown in FIG. 7B on the display unit 110. If Yes is selected while the screen of FIG. 7B is being displayed, that is, if a tap operation is accepted at the region in which Yes is displayed in the message 560 (YES at S134), the execution unit 250 executes the processing of S150.

After the processing of S152, alternatively, if the judgment unit 260 has not accepted an operation that sets near-field communication to on in the processing of S134, the judgment unit 260 determines whether or not an operation that displays the address book has been accepted (S205). This operation refers to, for example, an operation that displays the address book from the menu screen based on a tap operation to the menu key 122(*a*). If the operation was to display the address book, the display controller 270 displays the address book on the display unit 110 (S210). Then, if the judgment unit 260 determines that an operation to send e-mail has been accepted after an operation to select an address had been accepted, the home screen information is transmitted to the selected destination by e-mail.

If, however, the judgment unit 260 determines NO at S200, NO at S220, and NO at S190 or NO at S230, the judgment unit 260 further determines whether or not a cancel operation has been accepted and, if it determines that a cancel operation has been accepted (YES at S250), the execution unit S250 terminates the home screen transmitting program, and it determines that a cancel operation has not be accepted (NO at S250), the execution unit 250 re-executes the processing of S110. In this case, the cancel operation refers to, for example, a tapping operation at the home key 122(*b*).

Next, the flow of processing of the home screen receiving program 350 executed by the execution unit 250 will be described using FIG. 5.

Figure 5:
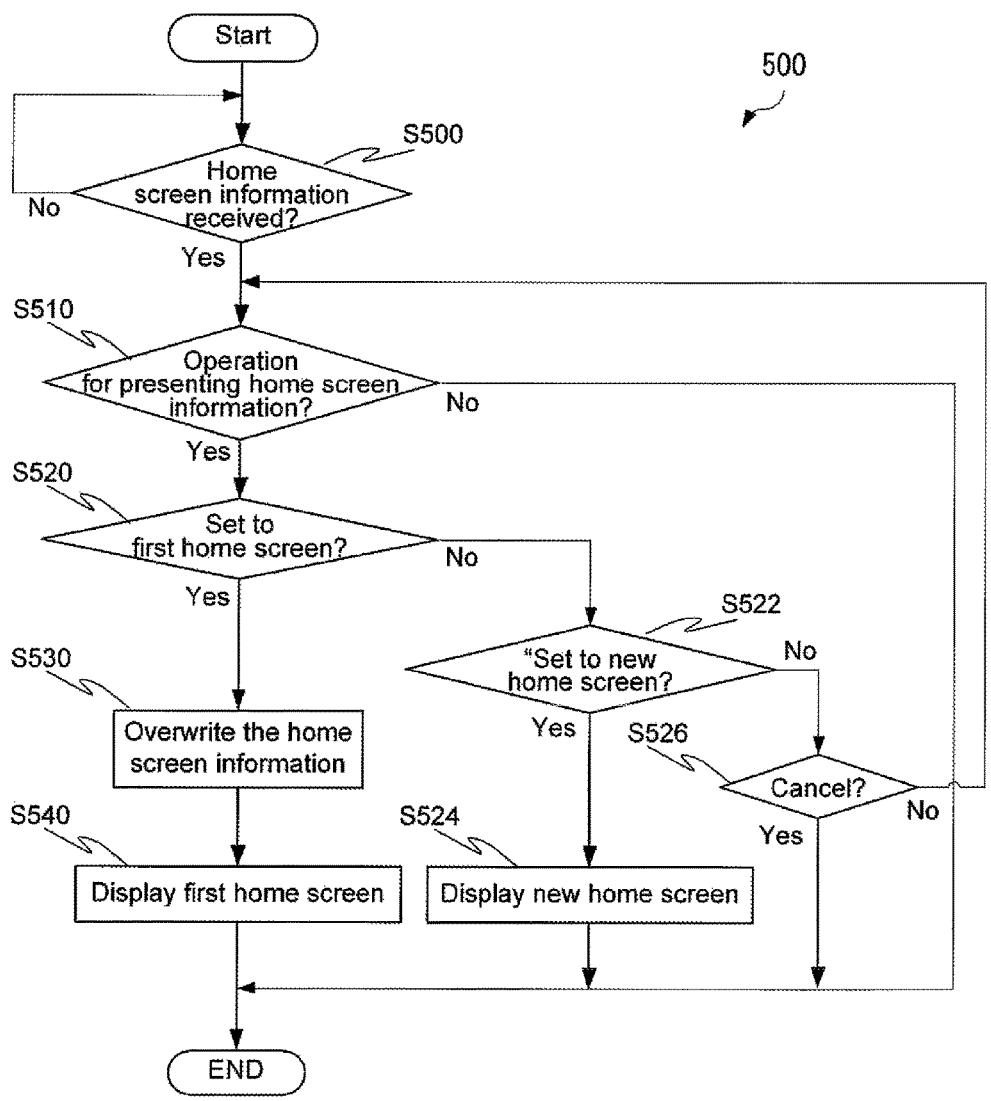
FIG. 5 is an illustration of an exemplary flowchart showing a home screen receiving program processed by a communication terminal according to an embodiment of the disclosure.

FIG. 5 is an illustration of an exemplary flowchart showing a home screen receiving program 350 (process 500) that can be executed by the executing unit 250 according to an embodiment of the disclosure. The various tasks performed in connection with the process 500 may be performed by software, hardware, firmware, a computer-readable medium having computer executable instructions for performing the process method, or any combination thereof. The process 500 may be recorded in a computer-readable medium such as a semiconductor memory, a magnetic disk, an optical disk, and the like, and can be accessed and executed, for example, by a computer CPU in which the computer-readable medium is stored.

It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. In some embodiments, portions of the process 500 may be performed by different elements of the communication terminal 100 explained above. Process 500 may have functions, material, and structures that are similar to the embodiments shown in FIGS. 1-4. Therefore common features, functions, and elements may not be redundantly described here.

When the execution unit 250 executes the home screen receiving program 350, the judgment unit 260 monitors whether or not home screen information has been received (S500). The home screen information is received by near-field communication or e-mail.

Next, the judgment unit 260 determines whether or not an operation has been accepted that presents the home screen information. The operation that presents the home screen information includes, for example but without limitation, an operation that selects home screen information received by near-field communication, an operation that selects home screen information attached to an e-mail, or other suitable operation for presenting the home screen information. If the judgment unit 260 determines that an operation that selects a home screen has been accepted, the execution unit 250 causes the screen indicated in FIG. 8A to be displayed on the display unit 110.

Then, if the screen of FIG. 8A is displayed on the display unit 110 and the judgment unit 260 determines that an operation that selects the presentation of a first home screen (for example, a tap operation at a region of the message 570 in which presentation of the first home screen is displayed) has been accepted, the execution unit 250 overwrites the home screen information regarding the first home screen stored in the terminal received beforehand with the received home screen information (S530), and causes the display unit 110 to display the first home screen, based on the overwritten home screen information.

If the screen of FIG. 8A is displayed on the display unit 110 and the judgment unit 260 determines that an operation that selects the presentation of a new home screen (for example, a tap operation at a region of the message 570 which presentation of the new home screen is displayed) has been accepted, the execution unit 250 generates new home screen based on the received home screen information, and causes the display unit 110 to display generated new home screen.

If the screen of FIG. 8A is displayed on the display unit 110 and the judgment unit 260 determines that an operation that selects no presentation (for example, a tap operation at a region of the message 570 in which no presentation is displayed), that is, an operation that cancels the presentation of home screen information has been accepted, the execution unit 250 stops the presentation of the home screen information.

If the display unit 100 displays the presented home screen and a prescribed operation (for example, a tap operation) with respect to an icon or widget in the home screen has been accepted, an application related to the icon or widget is executed.

As another aspect, if applications related to icons and widgets have already been stored into another communication terminal that has received home screen information, a message for confirming whether or not the information regarding the applications is to be overwritten is displayed on the display unit 110, and the user may select whether or not the processing for overwriting is to be executed. Alternatively, an already-existing application may be overwritten automatically.

As yet another aspect, icons and widgets may function as shortcuts for URLs of the acquisition sources for the applications related thereto. For example, if the copyright of an application is held by another person, an icon or widget functions as a shortcut for the purpose of accessing a prescribed URL, as described above.

Further embodiments, without limitation, will be described below.

The present disclosure is not limited to a straight type of communication terminal such as the communication terminal 100 shown in FIG. 1, and alternatively may be applied to a folding-type communication terminal 100 or sliding-type communication terminal having the touch panel 170.

Regarding the processing of the home screen transmitting program 340, the order of the processing of S130 to S152 and S110 to S125 may be reversed. That is, if the judgment unit 260 determines that an operation to execute a home screen transmission has been accepted, the judgment unit 260 may first judge whether or not near-field communication is on at S130, followed by execution of processing for indicating a candidate of the home screen that is to be transmitted to the display unit 110 (S110).

Furthermore, background image and information indicating whether or not the data is data to which another person holds the copyright may be stored in the home screen information. When the home screen to be transmitted is selected, the judgment unit 260 determines, based on that information, whether or not the background image cannot be transmitted to another communication terminal because the home screen information indicates that the copyright thereto is held by another person. If a determination is made that transmission cannot be done, the display unit 110 may make a display to that effect. Alternatively, if a determination is made that transmission can be done, transmission may be done of the home screen information, including a background image, to the selected other communication terminal. Such an embodiment enables sharing of home screen information, including background images, with the other communication terminals.

Also, the program described in the present embodiment may be stored in the hard-disk drive of a server for the purpose of distribution of data, to distribute it to the communication terminal 100 via a network. Alternatively, a plurality of programs may be stored in a storage medium, for example, an optical disk such as a CD, a DVD, a Blue-ray™ (Disk, a USB memory, or a memory card and sold or distributed in that form. If a plurality of programs downloaded via the above-described server or storage media are installed in an electronic document terminal having the same constitution as the present embodiment, the same effects as the present embodiment can be obtained.

In the processing at S540, the received home screen information overwrites the home screen information of the first home screen. However, the home screen based on the received home screen information may be set as the first home screen, and also an already-existing first home screen and another home screen may be changed in sequence order to the second and then the third home screen.

Additionally, the present embodiments are not limited to those noted above, but may be applicable to a smartphone, a personal digital assistant (PDA), a notebook-type PC, or other communication device.

In this document, the terms "computer program product", "computer-readable medium", and the like may be used generally to refer to media such as, for example, memory, storage devices, or storage unit. These and other forms of computer-readable media may be involved in storing one or more instructions for use by the control unit 230 to cause the control unit 230 to perform specified operations. Such instructions, generally referred to as "computer program code" or "program code" (e.g., which may be grouped in the form of computer programs or other groupings), when executed, enable the processes 400 and 500.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although above Figures depict example arrangements of elements, additional intervening elements, devices, features, or components may be present in an embodiment of the disclosure.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A wireless communication device comprising:
a display configured to display a plurality of home screens comprising display objects related to one or more applications;
a transmitter;
a touch panel configured to accept a touch input to the display;
a memory storing screen information for each of the plurality of home screens, wherein the screen information for each of the plurality of home screens identifies display objects in that home screen, positions of those display objects in that home screen, and source information for the applications related to those display objects in that home screen; and
at least one processor that,
in response to a user operation, displays a selection screen comprising a thumbnail for each of the plurality of home screens and a graphic for one or more communication candidates,
in response to a touch operation to the touch panel that comprises sliding the thumbnail for one of the plurality of home screens to the graphic for one communication candidate, controls the transmitter to transmit the screen information associated with the one home screen to the one communication candidate,
in response to receiving screen information from another device, displays a screen comprising inputs for selecting one of a plurality of display destinations for a home screen represented by the received screen information, wherein the plurality of display destinations comprise a primary home screen of the wireless communication device, and,
when the primary home screen is selected as the display destination, replaces the primary home screen with the home screen represented by the received screen information.

2. The wireless communication device according to claim 1, wherein the transmitter transmits the screen information to the one communication candidate by near-field communication.

3. The wireless communication device according to claim 1, wherein the plurality of display destinations comprise a new home screen of the wireless communication device, and wherein the at least one processor, when the new home screen is selected as the display destination, adds the home screen represented by the received screen information to a set of one or more existing home screens.

4. The wireless communication device according to claim 1, wherein the display objects comprise a widget.

5. The wireless communication device according to claim 1, wherein the source information for at least one application comprises a uniform resource locator (URL) for downloading the at least one application from a remote location.

6. An information communication method in a communication terminal comprising a display configured to display a plurality of home screens comprising display objects related to applications, a touch panel, and a transmitter, the method comprising:
storing screen information for each of the plurality of home screens, wherein the screen information for each of the plurality of home screens identifies display objects in that home screen, positions of those display objects in that home screen, and source information for the applications related to those display objects in that home screen;
in response to a user operation, displaying a selection screen comprising a thumbnail for each of the plurality of home screens and a graphic for one or more communication candidates;
in response to a touch operation to the touch panel that comprises sliding the thumbnail for one of the plurality of home screens to the graphic for one communication candidate, controlling the transmitter to transmit the screen information associated with the one home screen to the one communication candidates;
in response to receiving screen information from another device, displaying a screen comprising inputs for selecting one of a plurality of display destinations for a home screen represented by the received screen information, wherein the plurality of display destinations comprise a primary home screen of the wireless communication device; and,
when the primary home screen is selected as the display destination, replacing the primary home screen with the home screen represented by the received screen information.

7. The method of claim 6, wherein the transmitter transmits the screen information to the one communication candidate by near-field communication.

8. The method of claim 6, wherein the plurality of display destinations comprise a new home screen of the wireless communication device, and wherein the method further comprises, when the new home screen is selected as the display destination, adding the home screen represented by the received screen information to a set of one or more existing home screens.

9. The method of claim 6, wherein the display objects comprise a widget.

10. The method of claim 6, wherein the source information for at least one application comprises a uniform resource locator (URL) for downloading the at least one application from a remote location.

* * * * *